March 3, 1964 R. E. PRESCOTT ETAL 3,123,676

TELEPHONE CALL TRANSMITTER

Filed May 23, 1962 6 Sheets-Sheet 1

INVENTORS R. E. PRESCOTT
E. WATKINSON

BY R. O. Nimz

ATTORNEY

March 3, 1964 R. E. PRESCOTT ET AL 3,123,676

TELEPHONE CALL TRANSMITTER

Filed May 23, 1962 6 Sheets-Sheet 2

INVENTORS R. E. PRESCOTT
E. WATKINSON

BY R. O. Nimz

ATTORNEY

March 3, 1964 R. E. PRESCOTT ETAL 3,123,676

TELEPHONE CALL TRANSMITTER

Filed May 23, 1962 6 Sheets-Sheet 3

INVENTORS R. E. PRESCOTT
E. WATKINSON

BY R. O. Nimz

ATTORNEY

TELEPHONE CALL TRANSMITTER

Filed May 23, 1962 6 Sheets-Sheet 4

INVENTORS R. E. PRESCOTT
E. WATKINSON
BY R. O. Nimz
ATTORNEY

INVENTORS R. E. PRESCOTT
E. WATKINSON
BY
R. O. [signature]
ATTORNEY

INVENTORS R. E. PRESCOTT
E. WATKINSON
BY R. O. Nimz
ATTORNEY 3,123,676
Patented Mar. 3, 1964

3,123,676

TELEPHONE CALL TRANSMITTER

Robert E. Prescott, Rumson, and Edwin Watkinson, Colts Neck, N.J., assignors to Bell Telephone Laboratories, Incorporated, New York, N.Y., a corporation of New York Filed May 23, 1962, Ser. No. 197,010
5 Claims. (Cl. 179—90)

This invention relates to telephone substation calling systems and, more particularly, to miniature pushbutton call transmitters for use in such systems.

The advantages of pushbutton controlled subscriber voice-frequency signaling are pointed out in the copending application of L. A. Meacham and F. West, Serial Number 759,474, filed September 8, 1958, and assigned to applicants' assignee.

Some of these advantages include more efficient use of transmission facilities, along with a reduction of calling time, as compared with a standard rotary dial, by approximately one-half. Moreover, pushbutton calling has received favorable subscriber acceptance.

As described in the above-identified Meacham et al. application, a high reliability can be obtained for calling signals with a dual frequency alternating current encoding scheme. That is, the operation of a single pushbutton selects two frequencies, one out of a plurality of three frequencies and the other out of a different plurality of four frequencies forming a band separated from the three-frequency band. The operation of the pushbutton also enables an oscillator tuned to these frequencies by the pushbuttons. The two frequencies are transmitted over the telephone line to the central office for detection and registration of the digit.

One pushbutton calling apparatus for performing this function is disclosed in the copending application of C. E. Mitchell et al. Serial No. 860,549, filed December 18, 1959. In that application, a mechanism is described utilizing a matrix of actuating bars or rocker assemblies for operating switch contacts at two coordinates of an array. The actuating bars for each coordinate, however, are located in different planes, complicating the fabrication of the mechanism and utilizing a large amount of space. Furthermore, the switch contacts were arranged to travel in the same direction as the pushbuttons, thus tending to eject the pushbutton and actuating rod assemblies upon removal of the cover plate. Assembly of the apparatus was thus rendered difficult, requiring holding jigs. In addition, the contacts were enclosed within a housing, rendering maintenance adjustments difficult. Since failure of any one of these contacts renders the entire calling apparatus unusable, this aspect of the structure is of major significance.

Pushbutton dials of the type disclosed in the aforementioned Mitchell et al. application have proved feasible for standard dials in desk-type telephones despite the difficulties mentioned above. A new type of telephone, however, called the "Dial-in-Handset," cannot utilize this calling apparatus. The Dial-in-Handset telephone places the calling apparatus, as well as the transmitter and receiver, in the handset. In order to provide a handset which can be conveniently held in the hand, a reduction in the size of the calling apparatus of an order of magnitude over the Mitchell et al. apparatus is required.

It is an object of the present invention to reduce the size of pushbutton call transmitters while at the same time improving the reliability and lowering the cost of such apparatus.

It is a more specific object of the present invention to reduce the volume of a cross bar matrix switch and at the same time simplify its fabrication and assembly.

These and other objects are achieved in accordance with the present invention by placing longitudinal and transverse actuating rods of the cross bar matrix in the same plane and providing U-shaped bends in the transverse rods to clear the longitudinal rods. The contacts operated by these rods are positioned perpendicular to the plane of the rods and bear on the rods above their pivot points, thus holding the bars in place. Since the bars are in the same plane, a simple flange on the pushbuttons serves to engage and operate both sets of bars. Round pushbuttons without any angular orientation requirements are therefore possible.

One feature of the present invention resides in the small size and weight of the parts such that the only restoring force on the pushbuttons which is required is afforded by the contact members themselves, thus reducing the cost of the components and saving assembly time. As noted above, assembly time is also saved due to the position of the contacts with respect to the pivot points of the actuating bars, tending to hold the assembly together rather than force it apart.

Another feature of the invention resides in a separate actuating bar for operating a set of snap action contacts in addition to the frequency determining contacts. This bar is operated by any of the longitudinal bars and operates auxiliary contacts for enabling the oscillator.

Another feature of the invention resides in a face plate for the call transmitter having vertical ridges separating the columns of pushbuttons. When used in a Dial-in-Handset, these ridges prevent false operation of the pushbuttons while holding the handset during a call. They also help to give rigidity to the face plate and aid in edge-lighting of the pushbuttons and numerals on the face plate.

Yet another feature of the invention resides in the use of a unitary frame to hold all of the contact and cross bar actuating rods. In addition, all of the electrical components required for the oscillator circuit are mounted on the same side of this frame. This leaves the bottom of the frame flat and hence the circuitry can be deposited on this surface by printed circuit techniques and connections to all components made on this surface by solder dipping. In addition, the frame serves to insulate all of the electrical components, rods, contacts and printed circuit conductors.

These and other objects and features, the nature of the present invention and its various advantages, will be more readily understood upon consideration of the attached drawings and of the following detailed description of the drawings.

Figure 1A:
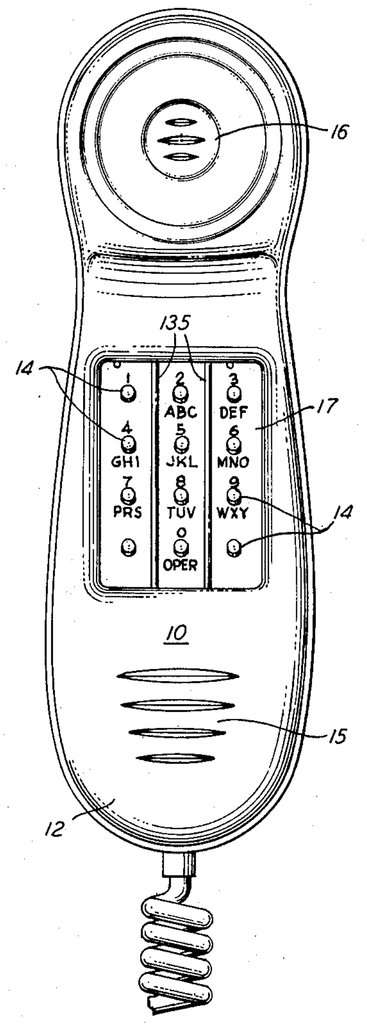
FIGS. 1A and 1B are front and side views, respectively, of a Dial-in-Handset telephone set utilizing the call transmitter of the present invention.
Figure 1B:
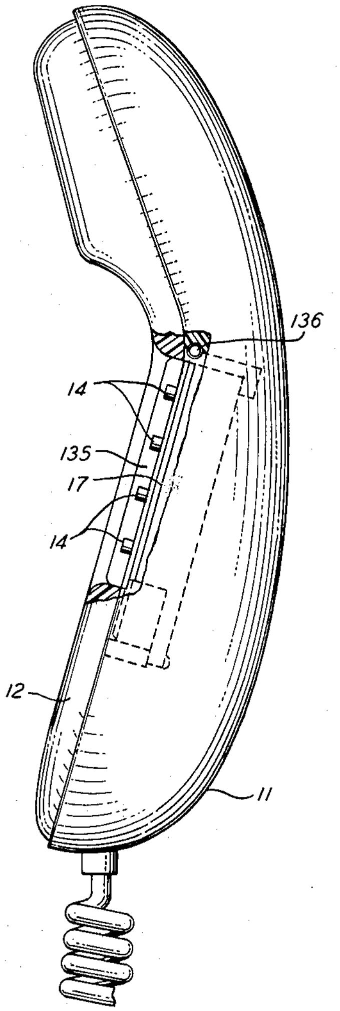

In FIGS. 1A and 1B, the Dial-in-Handset telephone set 10 includes a base portion 11, a cover portion 12 and a call transmitter 17 in accordance with the invention. The call transmitter 17 includes a plurality of pushbuttons 14 arranged in three columns of four pushbuttons each. The usual indicia or designations found on a rotary dial appear in the vicinity of ten of the pushbuttons 14 while the two additional pushbuttons found in the lower corners of the array are unlabeled and are available for additional services which may be offered. The telephone set 10 includes provisions for a speech transmitter 15 and a speech receiver 16. The speech and ringing aspects of the telephone set 10 are of the standard type except that all circuit components may be mounted within the integral Dial-in-Handset unit. The call transmitter employs the concepts of the multifrequency signaling system described in the Meacham et al. application referred to above. The detailed construction and operation of the call transmitter forms the subject matter of the present invention.

Figure 2:
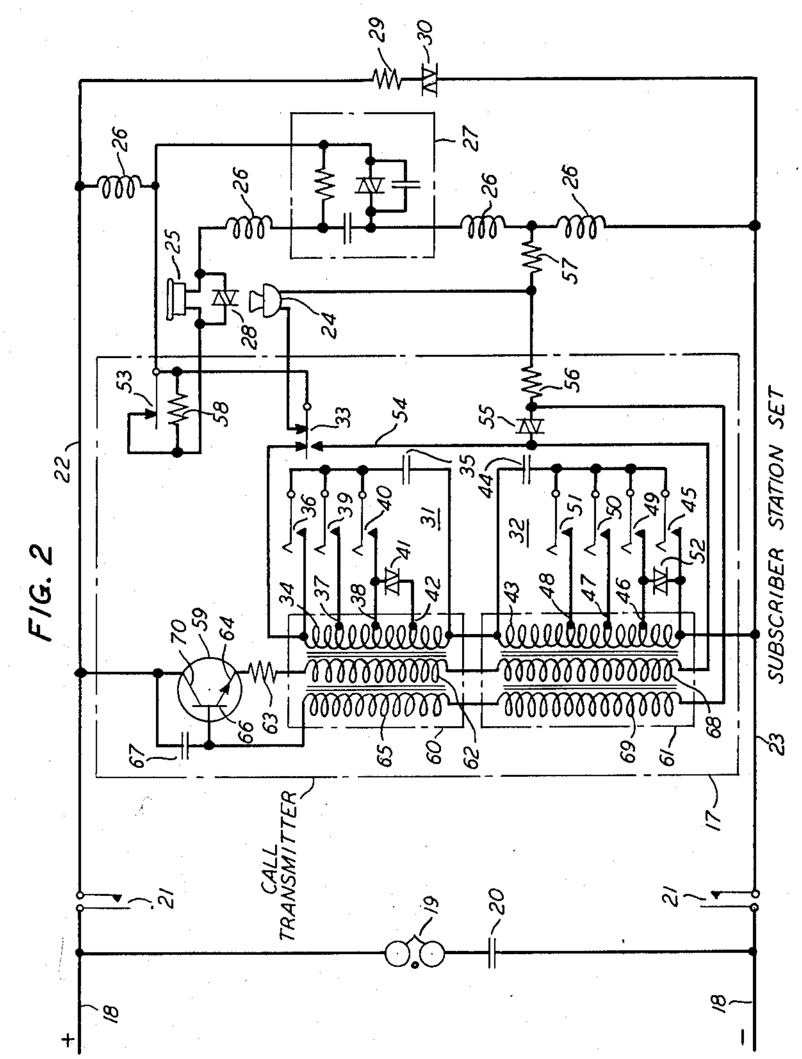
FIG. 2 is a circuit diagram of the call transmitter of the present invention showing the connections to the remainder of the telephone circuit.

In FIG. 2 there is shown a schematic circuit diagram of a telephone subscriber set including the call transmitter 17 and showing the connections of the call transmitter to the rest of the telephone circuits. In FIG. 2, the telephone subscriber set is connected by a pair of line conductors 18 to a telephone central office, not shown, which includes in the usual fashion a central office battery and a multifrequency calling signal register, preferably of the type disclosed in the copending application of L. A. Meacham and L. Schenker, Serial No. 743,434, filed June 20, 1958, and assigned to applicants' assignee.

Connected across the line conductors 18 is a conventional telephone ringer 19 and its associated capacitor 20. Each side of the telephone line includes a switchhook contact 21 which serves to connect the balance of the circuit of FIG. 2 to lines 18 only when the set 10 is removed from an on-hook condition. Conductors 22 and 23 connect the telephone line to the speech circuits of FIG. 2 when the set is off-hook. The call transmitter circuit 17 is connected between lines 22 and 23.

The speech circuits of the telephone set of FIG. 2 are of the conventional anti-sidetone type and include a transmitter 24, a receiver 25, an induction coil 26, and a line impedance balancing network 27. A varistor 28 is connected across receiver 25 to suppress clicks in the receiver. A shunt branch around the speech circuit, including a resistor 29 and a diode 30, is utilized for telephone loop length compensation.

When the telephone set 10 of FIG. 1 is on-hook, the contacts of FIG. 2 are in the positions shown. When the telephone set 10 is lifted from its on-hook position, both of switchhook contacts 21 close and the speech circuits are placed across the telephone lines 18. The speech circuits may then be used for communicating with a calling party.

In initiating a telephone call, the call transmitter 17 is utilized. Transmitter 17 is controlled by the subscriber and is intended to allow the rapid transmission of digit information to the central office. The subscriber, by the depression of any of the several pushbuttons 14 in FIG. 1, closes two pairs of contacts, each pair determining a frequency, the particular combination of the two frequencies indicating the digit. The depression of the pushbuttons also operates contacts which energize the call transmitter to generate the two frequencies and transmit them out over the line, and operates contacts to reduce the level of the signaling tones in the receiver.

The call transmitter 17 comprises a pair of resonant circuits 31 and 32 normally connected in series between lines 22 and 23. This circuit can be traced from line 22 through the upper coil 26, through transfer switch 33, through resonant circuits 31 and 32 to line 23. Resonant circuit 31 comprises a tapped coil 34 and a capacitor 35 arranged to be connected across the entire coil 34 by way of contacts 36 or across any of the sections formed by taps 37 and 38 by way of contacts 39 and 40, respectively. A varistor limiting device 41 is connected between tap 38 and a third tap 42.

The resonant circuit 32 includes a tapped coil 43 and a capacitor 44 arranged to be connected across the entire coil 43 by way of contacts 45 or across any of the sections formed by taps 46, 47 and 48 by way of contacts 49, 50 and 51 respectively. A varistor limiting device 52 is connected between taps 46 and one end of coil 43.

Each of the pushbuttons 14 of FIG. 1 is arranged to close two pairs of contacts, one from the group in resonant circuit 31 and the other in resonant circuit 32, as will be described in detail hereafter. By proper selection of the pairs operated by each pushbutton, a two-out-of-seven multifrequency code can be implemented to generate twelve discrete codes corresponding to the twelve pushbuttons 14 in FIG. 1.

Mechanically coupled to all of the pushbuttons 14 are transfer switch 33 and a pair of contacts 53. Transfer switch 33 is designed to open the series circuit including resonant circuits 31 and 32, connected between lines 22 and 23, when operated, and to establish a series circuit from line 22, through upper coil 26, switch 33, lead 54, diode 55, resistor 56, resistor 57, and lower coil 26, to line 23. Diode 55 is of the Zener breakdown type and, when energized by the operation of switch 33 as described, provides an essentially constant voltage drop across its terminals.

Contacts 53 are normally closed to short out a resistor 58 connected in series with receiver 25. When operated by any one of pushbuttons 14 in FIG. 1, contacts 53 open and insert resistor 58 in the receiver circuit. The level of the signaling tones in the receiver is thereby reduced so as not to produce excessively loud sounds during signalling.

The resonant circuits 31 and 32 form the frequency determining elements of a multifrequency feedback transistor oscillator comprising transistor 59, transformers 60 and 61 and the associated circuitry. Coil 34 in resonant circuitry 31 forms one secondary winding of transformer 60. The primary winding 62 of transformer 60 is connected by way of negative feedback resistor 63 to the emitter electrode 64 of transistor 59. The other secondary winding 65 couples energy back to the base electrode 66 of transistor 59. Feedback capacitor 67 suppresses spurious oscillations in the oscillator circuit.

Coil 43 in resonant circuit 32 forms one secondary winding of transformer 61. The primary winding 68 of transformer 61 is connected in series with primary winding 62 of transformer 60 to emitter 68 of transistor 59. The other secondary winding 69 is connected in series with secondary winding 65 of transformer 60 and couples energy to base 66 of transistor 59. The collector 70 of transistor 59 is connected directly to line 22.

The circuit of FIG. 2 operates as follows: On receiving calls, the handset is removed from the on-hook position, closing contacts 21 and connecting the speech circuits to lines 18 as described above. The speech circuits are fully enabled in this condition and can be used as in standard telephone circuits. The elements of call transmitter 17 connected to the speech circuit do not interfere with the operation of the speech circuits and merely provide a small additional drain on the line current.

In initiating a call, the closing of switchhook contacts 21 allows current to flow through the series circuit including line 22, upper coil 26, transfer switch 33, coil 34 in resonant circuit 31, coil 43 in resonant circuit 32, and line 23. The current flow through coils 34 and 43 stores energy in these coils. Upon depression of any one of pushbuttons 14 in FIG. 1, the following things occur: contacts 53 open to insert resistor 58 in series with receiver 25 and reduce the signal level therein; one of contacts 36, 39 and 40 in resonant circuit 31 closes; one of contacts 45, 49, 50 and 51 in resonant circuit 32 closes; and transfer switch 33 operates to open the series circuit including coils 34 and 43, and closes a series circuit including diode 55.

Upon the operation of switch 33, the flow of current through coils 34 and 43 is abruptly terminated. The rapid decay of current produces a large voltage buildup across coils 34 and 43 which serves to shock-excite resonant circuits 31 and 32 and generate oscillations in these resonant circuits at the frequencies determined by the closed ones of contacts 36, 39 or 40 and 45, 49, 50 or 51.

Transistor 59 is energized by a circuit including line 22, collector 70, emitter 64, resistor 63, windings 62 and 68, diode 55, resistors 56 and 57, lower coil 26, and lead 23. A fixed emitter-base bias is provided by diode 55, one terminal of which is connected to base 66 by way of windings 65 and 69, and the other terminal of which is connected to emitter 64 by way of windings 62 and 68.

The oscillator circuit formed by transistor 59, transformers 60 and 61 and resonant circuits 31 and 32 continues to oscillate at the two frequencies determined by the two resonant circuits. Varistors 41 and 52 in the resonant circuits 31 and 32, respectively, serve to limit the amplitude of oscillations at each of these frequencies, thus maintaining transistor 59 in a linear range of its opertion and preventing saturation at any one frequency.

The two frequency tone burst generated by call transmitter 17 is transmitted on lines 18 to the central office to be decoded and stored. Since the shock excitation builds this tone burst up to full amplitude very rapidly, the signaling tone burst need continue for only a brief interval in order to insure accurate reception at the central office. Indeed, the pushbutton need be held depressed only for an interval of ten to fifteen milliseconds, much shorter than the average person requires to operate the pushbutton.

When the depressed pushbutton is released, the closed ones of contacts 36, 39 or 40 and 45, 49, 50 or 51 are opened, switch 33 returns to the position illustrated, and oscillations abruptly terminate. The circuit is immediately ready for the depression of another pushbutton and the signaling of another digit. In this way, all of the digits of an entire telephone number can be transmitted in succession by the successive depression of the appropriate pushbuttons. The speech circuits can thereafter be used as in receiving calls.

The entire circuit of FIG. 2 described above is essentially the same as that disclosed in the afore-mentioned copending application of Meacham and West. This subject matter forms no part of the present invention and has been included only for the purposes of clarity. The mechanical construction of call transmitter 17, to be described in detail in connection with FIGS. 3 through 6, does form the subject matter of the present invention and provides all of the operations required by the description of FIG. 2 in a unitary structure which is simple, of miniature proportions, and inexpensive to build, assemble and maintain.

Figure 3:
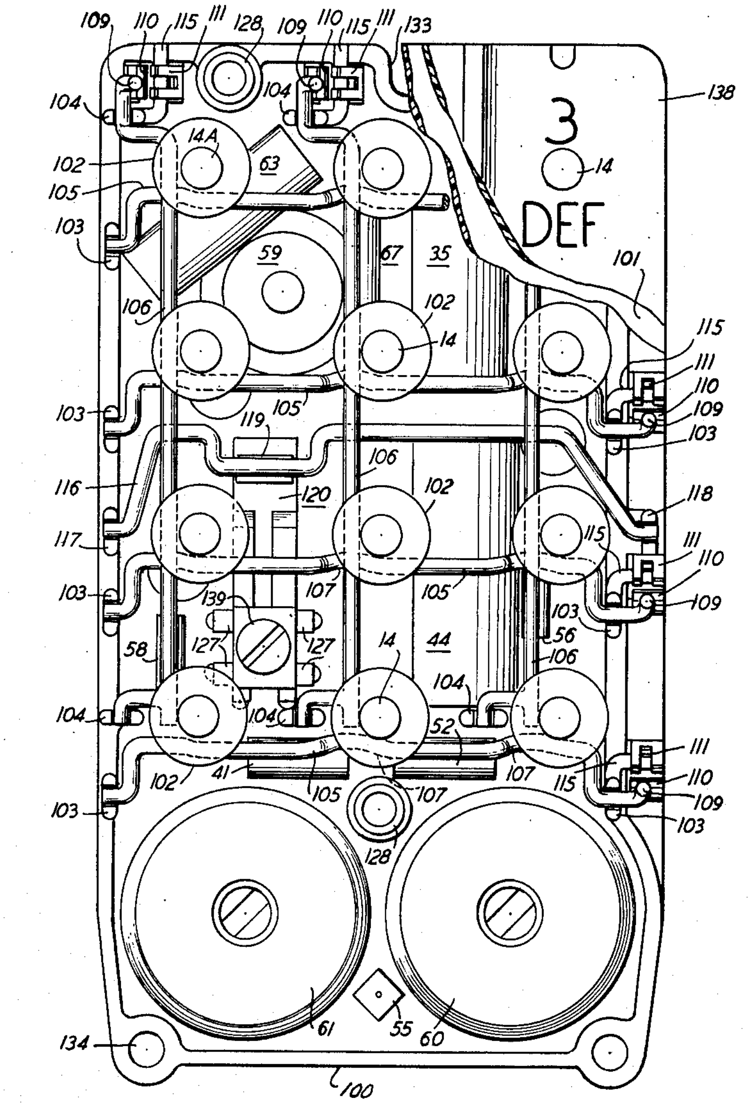
FIG. 3 is top view, partially in section, of the pushbutton call transmitter of the present invention.

Referring then to FIG. 3, the call transmitter 17 of FIGS. 1 and 2 may be seen as including a base frame 100, a cover plate 101 and a number plate 138, which are largely broken away in order to show the details of the mechanism. The pushbuttons 14, of which the digit "1" pushbutton 14A is typical, are cylindrical in general shape, having a flange 102 whose upper surface limits the upward travel of the pushbutton and whose lower surface provides a bearing surface for operating switch-actuating elements to be described (see FIGS. 4A and 4B.)

Base frame 100 is formed of dielectric material with four oppositely disposed pairs of longitudinal pillars 103 and three pairs of oppositely disposed transverse pillars 104 formed integrally therewith. Pillars 103 and 104 are formed with transverse slots forming journals for transverse operating rods 105 and longitudinal operating rods 106, respectively (see FIG. 6). The transverse and longitudinal operating rods 105 and 106 are journaled at the same level. Transverse rods 105 include U-shaped clearance loops 107 to provide clearance at each intersection with a longitudinal rod 106 and thus prevent mechanical interference and provide electrical insulation.

The journaled portions of rods 105 and 106 are offset from the main portion of the rods by right angle bends to allow each rod to rotate about the bearing when a pushbutton is depressed. All of rods 105 and 106 are retained in their respective bearings by extensions 108 on the underside of cover plate 101 (see FIG. 6). Each of pushbuttons 14 is positioned such that a portion of its flange 102 is directly over the intersection of one longitudinal actuating rod 106 and one transverse actuating rod 105. Hence, when any one of pushbuttons 14 is depressed, the flange 102 thereon rotates one longitudinal rod 106 and one transverse rod 105 around their respective pivot points in pillars 104 and 103.

Each of actuating rods 105 and 106 includes at one end a bent arm 109 projecting at right angles therefrom and bearing against a spring finger 110. Spring fingers 110 form one contact of frequency determining contacts 36, 39, 40 and 45, 49, 50, and 51 (FIG. 2). A bifurcated spring contact 111 is paired with each spring finger 110 to form the frequency contacts.

Figure 4A:
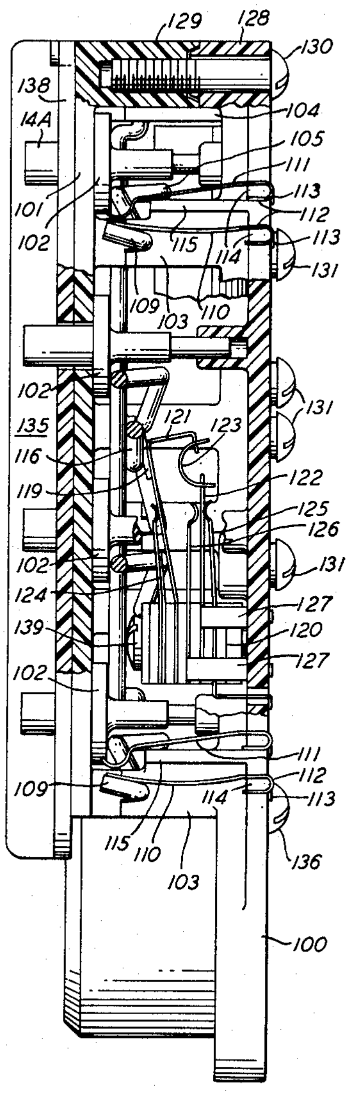
FIGS. 4A and 4B are side elevations, also partially in section, of the call transmitter of the present invention, showing the operation of the pushbuttons.
Figure 4B:
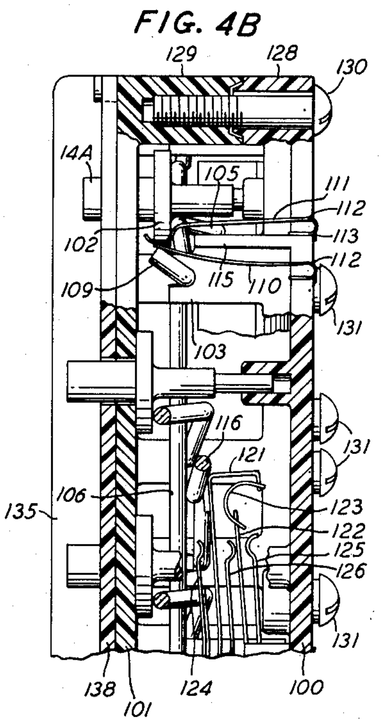

As can be better seen in FIGS. 4A and 4B, contacts 110 and 111 are formed with looped ends or hooks 112 from which a small pointed spear or tang 113 is cut out and bent open. In order to assemble the switch frequency contacts to the base frame 100, hooks 111 are forced into the slots 114 along two edges of frame 100 until the spear 113 is bearing against circuitry or circuit board at the bottom of frame 100. Soldering by some simple method such as dipping insures the mechanical connection of contacts 110 and 111 to frame 100 and also completes the electrical connection of these contacts to the printed circuitry on the bottom of frame 100.

In FIGS. 4A and 4B there are shown elevation and partial elevation views, partially in section, of the call transmitter of the present invention. FIG. 4A illustrates the normal or resting position of all contact elements when no pushbuttons are depressed. FIG. 4B illustrates the position of switching elements when one pushbutton 14A is depressed.

In the normal position of FIG. 4A, it can be seen that contacts 110 and 111 are separated and hence in an open condition. It will be noted that spring contacts 110 bear against bend 109 of bars 105 above the pivot point of these bars in pillars 103. Contacts 110 are pretensioned against bends 109 to insure the retaining of rods 105 and 106 in their respective bearings even when cover plate 101 is removed. This makes assembly and maintenance relatively simple since no jig is required to hold the rods in place when the cover plate is off.

Bifurcated spring contacts 111 are pretensioned against shoulders 115 formed integrally with pillars 103 and 104 in order to insure sufficient contact pressure with very small travel of the contact elements. When any one of pushbuttons 14 is depressed, as can be seen in FIG. 4B, one of rods 105 and one of rods 106 are rotated about their respective pivots. The bent arm 109 on the rod bears against a corresponding spring finger 110 and forces it to make contact with the paired spring contact 111, thus completing the connection through these contacts. Since the depression of each pushbutton operates two rods, one rod 105 and one rod 106, two sets of frequency contacts are simultaneously closed, one from the group 36, 39 and 40, and one from the group 45, 49, 50 and 51 (See FIG. 2).

It will be noted that the only restoring force provided to return pushbuttons 14 to their normal positions after being depressed is supplied by spring contacts 110 and 111. Due to the small size and weight of the pushbutton assembly of the present invention, this is normally all the restoring force required. It is, of course, possible to fabricate contact springs 110 and 111 of material having the properties necessary to provide whatever restoring force is required. In accordance with one feature of the present invention, the spring contacts, in combination with snap contacts to be described, provide all of the restoring force as well as serving as electrical contact elements. Furthermore, the round pushbuttons cannot bind since they require no angular orientation.

Figure 6:
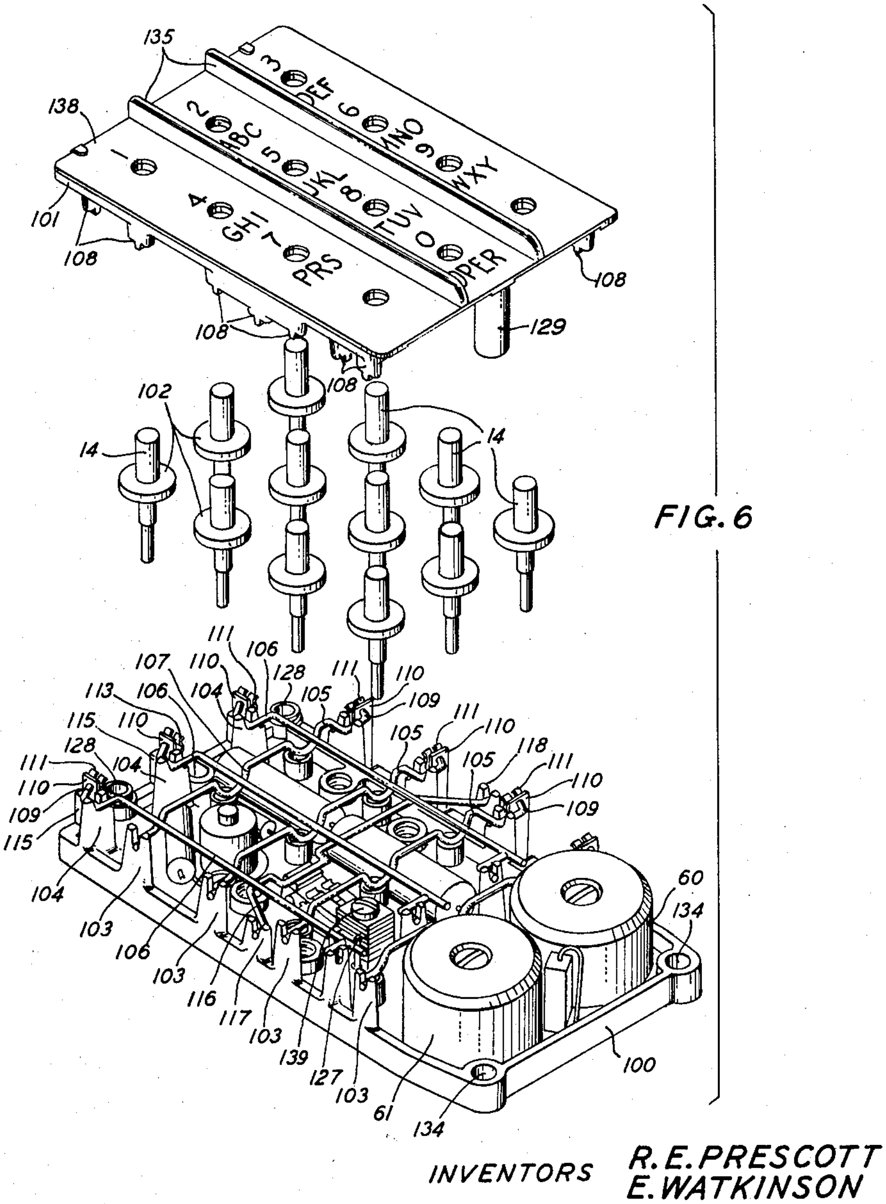
FIG. 6 is a perspective, exploded view of the call transmitter of the present invention showing some of the details more clearly.

A single operating bar 116 is journaled into pillars 117 and 118 generally parallel to rods 105 but at a lower level (see FIG. 6). Bar 116, in its normal position, bears against the underside of all of longitudinal rods 106 and rests on the insulating pad 119 on a snap switch 120. Snap switch 120 provides all of the contacts (33 and 53 in FIG. 2) required for operating the call transmitter, except for the frequency contacts. Snap switch 120 can be better seen in FIGS. 4A and 4B.

As can be seen in FIGS. 4A and 4B, snap switch 120 comprises an armature 121 which carries insulating pad 119 and which is mechanically coupled to transfer spring contact 122 by a C-spring 123. In the normal position shown in FIG. 4A, armature 121 makes contact with bifurcated spring contacts 124. Together armature 121 and contacts 124 form the normally closed contacts 53 in FIG. 2.

Also shown in the normal position in FIG. 4A, transfer contact 122 makes contact with lower spring contacts 125 and is separated from upper spring contacts 126. It will be noted that lower contacts 125 are split electrically so that in the position shown in FIG. 4A, transfer contact 122 completes a connection between the two halves of contacts 125.

When a pushbutton such as pushbutton 14A in FIG. 4B is depressed, one of longitudinal rods 106 forces operating bar 116 against pad 119 to depress armature 121. Armature 121 then compresses C-spring 123 until a certain position is reached where C-spring 123 is free to extend. This snap action transfers contact 122 from lower contacts 125 to upper contacts 126 in the position shown in FIG. 4B. Contacts 122, 125 and 126 comprise transfer contacts 33 in FIG. 2.

From the above description, it can be seen that the depression of any pushbutton 14 serves to close two frequency contacts and to operate snap switch 120. The frequency contacts close first, then contacts 53 (FIG. 2) close and, finally, under the influence of C-spring 123, transfer contacts 33 snap to their operated position. In this way, all of the electrical switching requirements of FIG. 2 are met with the call transmitter assembly shown in FIGS. 3 through 6.

Figure 5:
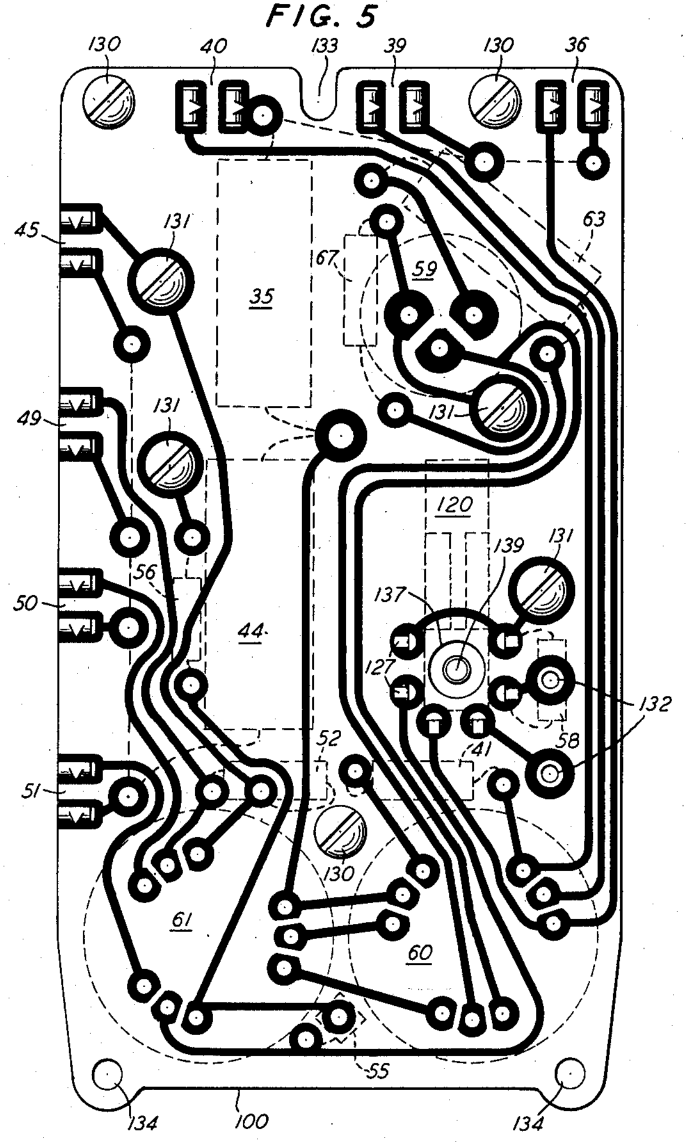
FIG. 5 is a bottom view of the call transmitter of the present invention, showing the printed circuit.

In the space between the floor of base frame 100 and the operating rods 105 and 106 are mounted a plurality of components including capacitors 35, 44 and 67, resistors 56, 58 and 63, diodes 41, 52 and 55, transformers 60 and 61, and transistor 59, as well as snap switch 120. It will be noted that all of the components of the call transmitter are mounted on the same side of base frame 100 as the operating rods and pushbuttons. In accordance with this feature of the invention, the bottom side of base frame 100 is left flat and free of components. As shown in FIG. 5, this allows the bulk of the circuitry of the call transmitter to be printed directly on this bottom side, or provides a flat mounting surface for a separate printed board, if desired. Connections are made from the components to the printed circuitry by inserting wire ends through small holes in base frame 100. Mechanical connection as well as electrical connection can then be made by a simple process such as solder dipping.

It will be noted that the connections to snap switch 120 are made through bent tangs 127 which are formed as part of the contact elements. These tangs are also inserted through small holes in base frame 100 and attached by solder dipping or some such soldering technique. Snap switch 120 is secured slightly off the floor of base frame 100 so that small adjustments can be made in its position by bending the mounting tangs 127 through adjustment hole 137. Specifically, adjustment can be made by means of an internally threaded adjustment tool which threads onto the assembly screw 139 holding the contact pile-up together.

Cover plate 101 is spaced from base frame 100 by spacing pillars 128 on base frame 100 and matching spacing pillars 129 on cover plate 101. These assemblies, together with number plate 138, are fastened together by three screws 130 passing through the center of pillars 128 and threading into pillars 129. The pillars 128 and 129 insure registration of the pushbutton operation as well as prevent the binding of rods 103, 105 and 106 by retaining extensions 108. In order to assemble the entire call transmitter, it is merely necessary to mount all of the electrical components on the base frame 100, soldering them in place, lay the snap switch operating bar 116 in pillars 117 and 118, place transverse operating rods 105 in pillars 103 and longiudinal rods 106 in pillars 104, place the pushbuttons in their buide holes, place cover plate 101 already assembled to number plate 138 by adhesives, over the entire assembly, and fasten by means of screws 130.

The inductors 60 and 61, like snap switch 120, can also be mounted mechanically on studs extending from the inductors which also serve as electrical connectors. The screws in the tops of inductors 60 and 61 serve to adjust the position of tuning slugs passing through the centers of the cup cores and adjusting the reluctance of the magnetic coupling paths therebetween.

It will be noted that frequency contact springs 110 and 111 are perpendicular to the plane of the operating rods 105 and 106 and are normally in a vertical position. For this reason, the frequency contacts are self-cleaning to some extent. In addition, contact springs 110 and 111 are at the extreme exterior of the entire assembly and easily available for adjustment and maintenance without disassembling the entire call transmitter.

The utilization of the base frame 100 to the utmost is seen more readily in FIG. 6, showing a perspective exploded view of the entire assembly. The position of components and the arrangement of operating rods allow the fabrication of a call transmitter assembly measuring only about three inches by one and three-quarters inch by seven-eighths inch. Such dimensions make it quite easy to place the call transmitter 17 within a handset as shown in FIGS. 1A and 1B.

Electrical connections to the call transmitter are made by way of terminal screws 131 on the underside of base frame 100 and by solder holes 132 also in the underside of base frame 100 (see FIG. 5). The call transmitter 17 is attached to the handset 10 (FIGS. 1A and1B) by means of three screws through a notch 133 and two screw holes 134.

By keeping all of the operating rods 105 and 106 in virtually the same plane, a larger volume is made available for mounting components and the small size of the call transmitter of the present invention is made possible. This arrangement of rods also permits the use of round pushbuttons 14 requiring no special orientation of the operating flanges 102.

The underside of the transparent number plate 138 bears the indicia identifying each pushbutton 14 by digits and letters in conformance with standard dials. The pushbuttons are arranged in three columns of four pushbuttons and the columns separated by vertical ridges 135. As can be more readily seen in FIGS. 1A and 1B, the ridges 135 aid in the prevention of false operation of more than one pushbutton by confining the operator's finger to a single column. In addition, the ridges prevent false operation of the pushbutton while holding the handset 10 during conversation. Finally the ridges 135 aid in edge-lighting the number plate 138 by means of a lamp 136. The ridges increase the cross-section to carry light from the lamp to the vicinity of the indicia and pushbuttons and distribute this light from the sides of the ridges to the indicia. The number plate 138, of course, is selected for its light carrying properties and has been designed to carry very little mechanical load.

It is to be understood that the above-described arrangements are merely illustrative of one embodiment of the present invention. Numerous and varied other arrangements can be readily devised by those skilled in the art without departing from the spirit or scope of the invention.

What is claimed is:

1. A telephone call transmitter comprising a frame member and a cover member, spacing means for securing said cover member to said frame member and defining a mounting space therebetween, a plurality of oppositely disposed pairs of mounting pillars extending between said frame and cover members, an array of offset transverse rotating rods and offset longitudinal rotating rods mounted in said pillars between said frame and cover members, said longitudinal and transverse rods being mounted in the same plane, said transverse rods including U-shaped clearances at each intersection with a longitudinal rod, a plurality of cylindrical pushbuttons with cylindrical flanges supported by said frame and cover members, each pushbutton positioned to engage one transverse rod and one longitudinal rod at the intersection of the two, an elastic switching element for each rotating rod, said switching elements being perpendicular to the plane of said rotating rods and each engaging one of said rotating rods above their centers of rotation, and said cover member including columns of indicia registered with said pushbuttons and separated by vertical ridges.

2. A telephone call transmitter comprising a base frame including a plurality of oppositely disposed pairs of pillar members, an equal plurality of offset rotating rods extending between and supported by each pair of pillar members, a plurality of sets of spring contacts mounted in said frame, one contact of each set engaging one of said rotating rods above its respective pivot point, a plurality of operating members for engaging said rods and rotating said rods against their respectively engaged spring contacts to operate the set of contacts, a cover plate for enclosing said rotating rods and supporting said operating members, and spacing means for securing said cover plate to said base frame in a spaced-apart position, said spacing means including locking members registering with said pillar members.

3. The telephone call transmitter according to claim 2 wherein said sets of spring contacts are located along the edges of said base frame.

4. The telephone call transmitter according to claim 2 wherein said rotating rods are arranged in a rectangular matrix including all of said rods in a single plane and wherein one rod at each intersection of said matrix includes a U-shaped clearance loop.

5. A telephone substation calling mechanism comprising a housing including a base plate and a top plate having a plurality of registered apertures, one in the base plate and one in the top plate, and arranged in an array of rows and columns, separating means for separating said base plate and said top plate from each other, securing means for securing said top plate to said base plate in a spaced-apart position, a plurality of pushbuttons each including a stem portion and a shoulder portion, the stem portions each being mounted between one set of said registered apertures, a plurality of pillar members extending between said base plate and said top plate, a plurality of column actuating members extending between a first set of said pillar members and adjacent to said columns of apertures, a plurality of row actuating members extending between a second set of said pillar members and adjacent to said rows of apertures, in the same plane as said column actuating members, and including U-shaped clearances at each intersection of row and column actuating members, said shoulders on said pushbuttons being disposed to engage one row and one column actuating member, and normally open circuit contact means associated with each actuating member and operated by the engagement of one of said pushbuttons with the associated actuating member.

No references cited.